(12) United States Patent
Saito

(10) Patent No.: US 12,372,790 B2
(45) Date of Patent: Jul. 29, 2025

(54) VIRTUAL IMAGE DISPLAY DEVICE AND OPTICAL UNIT

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 551 days.

(21) Appl. No.: 17/459,786

(22) Filed: Aug. 27, 2021

(65) Prior Publication Data

US 2022/0066220 A1 Mar. 3, 2022

(30) Foreign Application Priority Data

Aug. 28, 2020 (JP) ................................. 2020-144249

(51) Int. Cl.
| | | |
|---|---|---|
| G02B 27/01 | (2006.01) |
| G02B 5/00 | (2006.01) |
| G02B 5/04 | (2006.01) |
| G02B 5/18 | (2006.01) |

(52) U.S. Cl.
CPC ......... G02B 27/0172 (2013.01); G02B 5/003 (2013.01); G02B 5/04 (2013.01); G02B 5/1861 (2013.01); G02B 2027/0178 (2013.01)

(58) Field of Classification Search
CPC ...... G02B 27/0172; G02B 5/003; G02B 5/04; G02B 5/1861; G02B 2027/0178; G02B 2027/0116; G02B 5/1842; G02B 2027/0174; G02B 27/01
See application file for complete search history.

(56) References Cited

U.S. PATENT DOCUMENTS

| | | | | |
|---|---|---|---|---|
| 6,185,045 B1* | 2/2001 | Hanano | ............. | G02B 27/0172 |
| | | | | 359/633 |
| 6,885,484 B2* | 4/2005 | Kasai | ............. | G02B 5/32 |
| | | | | 359/22 |
| 2001/0022689 A1* | 9/2001 | Takeyama | ........ | G02B 17/0848 |
| | | | | 359/627 |
| 2003/0147112 A1* | 8/2003 | Mukawa | ............. | G02F 1/13362 |
| | | | | 348/E9.027 |
| 2006/0268421 A1* | 11/2006 | Shimizu | ................ | G02B 5/32 |
| | | | | 359/630 |
| 2015/0212325 A1* | 7/2015 | Choi | ............. | G02B 5/04 |
| | | | | 359/13 |
| 2017/0219829 A1* | 8/2017 | Bailey | ............. | G02B 27/0172 |

(Continued)

FOREIGN PATENT DOCUMENTS

| | | |
|---|---|---|
| JP | H06-059217 A | 3/1994 |
| JP | 2016-085427 A | 5/2016 |
| JP | 2020-008749 A | 1/2020 |

*Primary Examiner* — Pinping Sun
*Assistant Examiner* — Gabriel A Sanz
(74) *Attorney, Agent, or Firm* — Oliff PLC

(57) ABSTRACT

A virtual image display device includes an imaging light generation device generating an imaging light, a transmission inclined mirror configured to reflect the imaging light, and a concave transmission mirror including: a partial reflection film reflecting the imaging light reflected transmission inclined mirror, and a reflection type diffraction layer being disposed on opposite to the reflection film. In the reflection type diffraction layer diffracts the imaging light in a direction that is different from a direction in which the reflection film reflects the imaging light.

12 Claims, 10 Drawing Sheets

(56) References Cited

U.S. PATENT DOCUMENTS

| | | | |
|---|---|---|---|
| 2018/0321736 A1* | 11/2018 | Masson | G02B 30/36 |
| 2019/0056598 A1* | 2/2019 | Saito | G02B 27/0172 |
| 2019/0094547 A1* | 3/2019 | Yamada | G02B 27/4205 |
| 2020/0018966 A1 | 1/2020 | Komatsu et al. | |
| 2020/0183169 A1* | 6/2020 | Peng | G02B 6/0055 |

* cited by examiner

VIRTUAL IMAGE DISPLAY DEVICE AND OPTICAL UNIT

The present application is based on, and claims priority from JP Application Serial Number 2020-144249, filed Aug. 28, 2020, the disclosure of which is hereby incorporated by reference herein in its entirety.

BACKGROUND

1. Technical Field

The present disclosure relates to a see-through type virtual image display device and an optical unit, and particularly relates to a type of a virtual image display device and an optical unit that allow imaging light to enter a concave transmission mirror and observe reflected light from the concave transmission mirror.

2. Related Art

As a virtual image display device, a so-called bird bath type device including a transmissive reflection surface and a concave transmission mirror is known (see JP-A-2020-008749). JP-A-2020-008749 describes a feature wherein the imaging light incident on a prism member provided with the transmissive reflection surface is guided by total internal reflection toward the transmissive reflection surface on the total reflection surface of the prism member, as well as the imaging light is reflected by the transmissive reflection surface toward the concave transmission mirror disposed in front of the prism member.

In the virtual image display device of JP-A-2020-008749, the imaging light is emitted to a front face, and therefore, there is a problem in that the image being displayed is visible from the outside.

SUMMARY

A virtual image display device according to an aspect of the present disclosure includes an imaging light generation device configured to generate an imaging light, a transmission inclined mirror configured to reflect the imaging light from the imaging light generation device, and a concave transmission mirror configured to have a concave shape, the concave transmission mirror includes: a partial reflection film that reflects a part of the imaging light and that transmits other part of the imaging light, the reflection film that reflects the imaging light reflected the transmission inclined mirror reflects, and a reflection type diffraction layer that is disposed on opposite to the reflection film. In the reflection type diffraction layer diffracts the imaging light in a direction that is different from a direction in which the reflection film reflects the imaging light.

DESCRIPTION OF EXEMPLARY EMBODIMENTS

First Exemplary Embodiment

Hereinafter, a virtual image display device according to a first embodiment of the present disclosure and an optical unit incorporated therein will be described with reference to FIGS. 1 to 4, etc.

Figure 1:
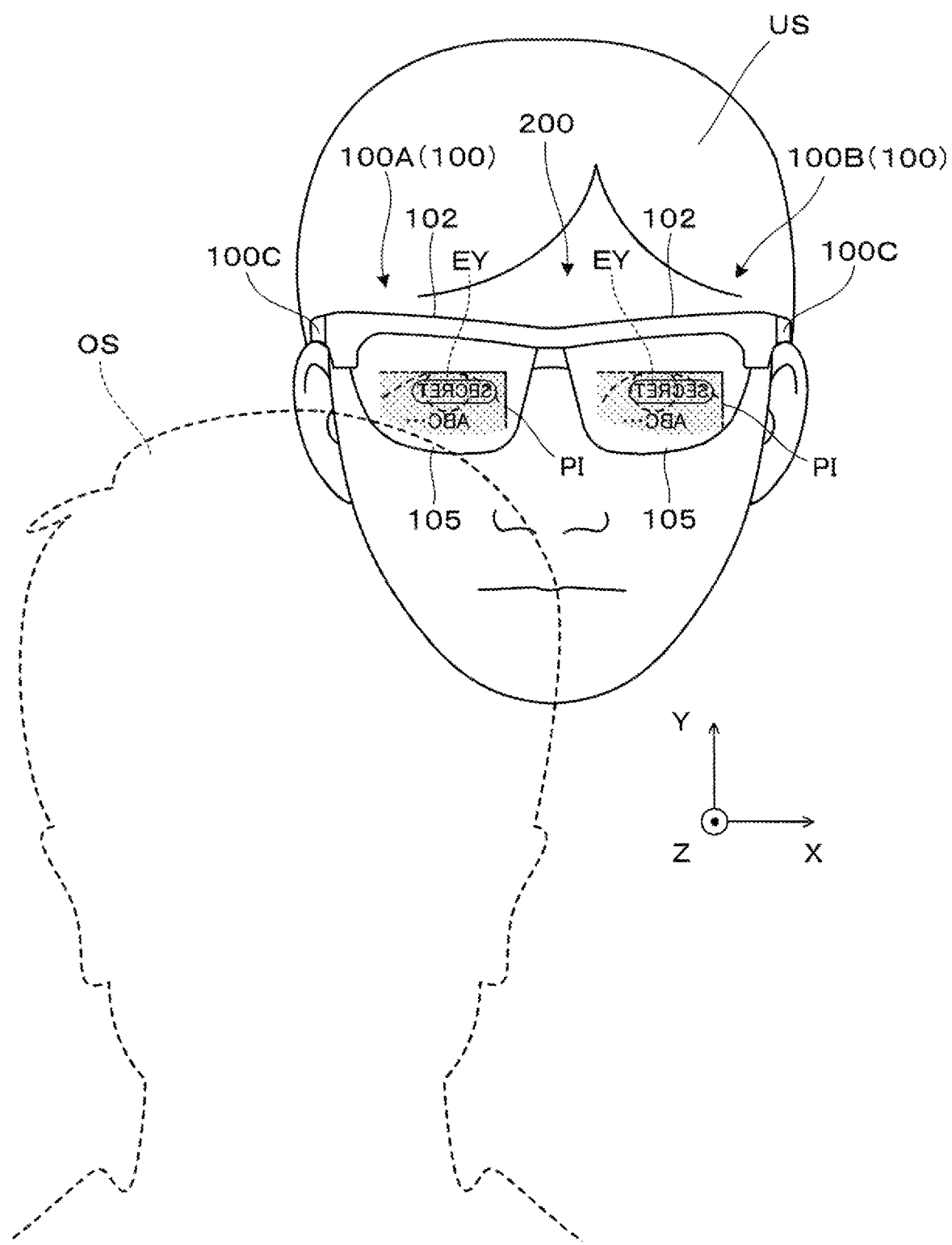
FIG. 1 is an external view illustrating a mounted state of a virtual image display device of a first exemplary embodiment.

FIG. 1 is a diagram illustrating a mounting state of a head-mounted display (hereinafter, also referred to as "HMD") 200. The HMD 200 causes an observer or wearer US wearing the HMD 200 to recognize an image as a virtual image. In FIG. 1, etc., X, Y, and Z are an orthogonal coordinate system, where an X direction corresponds to a lateral direction in which both eyes EY of the observer or wearer US wearing the HMD 200 or the virtual image display device 100 are aligned, a Y direction corresponds to an upward direction orthogonal to the lateral direction in which both eyes EY of the wearer US are aligned, and a Z direction corresponds to a front direction of the wearer US or a front face direction. The +Y direction is parallel to a vertical axis or a vertical direction.

The HMD 200 includes a first display device 100A for the right eye, a second display device 100B for the left eye, and a pair of temple support devices 100C for supporting the display devices 100A and 100B. The first display device 100A includes a display driving unit 102 disposed at an upper portion, and an appearance member 105 that has a spectacle lens shape and covers the front of the eye. Similarly, the second display device 100B includes a display driving unit 102 disposed at an upper portion, and an appearance member 105 that has a spectacle lens shape and covers the front of the eye. The support device 100C supports a top end side of the appearance member 105 via the display driving unit 102. The first display device 100A and the second display device 100B are optically inverted from left to right. Hereinafter, the first display device 100A for the right eye will be described as the representative virtual image display device 100.

A virtual image display device 100, which is the display device 100A for the right eye, will be described with reference to FIG. 2. The virtual image display device 100 includes an imaging light generation device 11, an optical unit 12, and a display control circuit 13. However, in the present specification, a device excluding the display control circuit 13 is also referred to as a virtual image display device 100 in terms of achieving optical functions. The imaging light generation device 11 and the display control circuit 13 are supported within an outer frame of the display driving unit 102 illustrated in FIG. 1. A portion of the optical unit 12 is also supported within the outer frame of the display driving unit 102.

The imaging light generation device 11 is a self-emitting display device. The imaging light generation device 11 is, for example, an organic EL (Organic Electro-Luminescence) display, and forms a color still image or a moving image on a two-dimensional display surface 11a. The imaging light generation device 11 is driven by the display control circuit 13 to perform display operation. The imaging light generation device 11 is not limited to organic EL displays, and can be replaced with display devices using inorganic EL, LED arrays, organic LEDs, etc. The imaging light generation device 11 is not limited to the self-emitting imaging light generation device, and may include an LCD or another light modulating element, and may form an image by illuminating the light modulating element with a light source such as a backlight. As the imaging light generation device 11, a LCOS (Liquid crystal on silicon, where LCOS is a registered trademark), a digital micro-mirror device, etc. may be used instead of the LCD.

The optical unit 12 is an imaging system including a projection lens 21, a wavelength selection unit 22, a transmission inclined mirror 23, and a concave transmission mirror 24. The optical unit 12 forms a virtual image with imaging light ML emitted from the imaging light generation device 11. In the optical unit 12, an optical path from the imaging light generation device 11 to the wavelength selection unit 22 is located on the upper side of the transmission inclined mirror 23. More specifically, the imaging light generation device 11, the projection lens 21 and the wavelength selection unit 22 are disposed in a space interposed between an inclined flat surface in which the transmission inclined mirror 23 is extended and a vertical surface in which an upper end of the concave transmission mirror 24 is extended upward.

The projection lens 21 is held within the outer frame of the display driving unit 102 illustrated in FIG. 1. The projection lens 21 enters the imaging light ML into the wavelength selection unit 22 while converging the imaging light ML emitted from the imaging light generation device 11 to form a virtual image with the imaging light ML. Although detailed explanation is omitted, the projection lens 21 may include one or more lenses and includes a spherical lens or an aspheric lens, but may also include a free-form lens.

The wavelength selection unit 22 is held within the outer frame of the display driving unit 102 illustrated in FIG. 1. The wavelength selection unit 22 limits component light of each color included in the imaging light ML from the imaging light generation device 11 that has passed through the projection lens 21 to a wavelength range that is narrower than the original wavelength range. The wavelength selection unit 22 includes a diffraction-absorbing member 22a and a prism 22b. Here, the diffraction-absorbing member 22a includes a first reflection type diffraction element D1 and a light-absorbing member 32. In the example illustrated in the drawings, the diffraction-absorbing member 22a is disposed perpendicular to an optical axis AX extending from the projection lens 21, but can be rotated at an appropriate inclination angle around an X-axis extending in a lateral direction to be in an inclined state. The prism 22b is disposed on the optical path on a light exit side of the diffraction-absorbing member 22a, i.e., the first reflection type diffraction element D1, and is disposed near the diffraction-absorbing member 22a.

In the diffraction-absorbing member 22a, the first reflection type diffraction element D1 has a structure in which a reflection type diffraction layer 31b is formed on an inner side (an exit pupil EP side in FIG. 2) of a plate shaped body 31a having optical transparency. The first reflection type diffraction element D1 diffracts the imaging light ML emitted from the imaging light generation device 11 with respect to a vertical direction, that is, the imaging light ML is diffracted so that the Y component is add to the original Z component in the YZ plane. When the imaging light ML from the imaging light generation device 11 is bent in an oblique downward direction by diffraction, the first reflection type diffraction element D1 narrow bands the band the component light of each color of the imaging light ML by the diffraction characteristic. Here, the first reflection type diffraction element D1 diffracts the imaging light ML while preserving a relative angular relationship of light rays that constitute the imaging light ML. In other words, the first reflection type diffraction element D1 acts as an optical element with a refractive power of zero with respect to the imaging light ML, like a flat surface mirror, and reflects the imaging light ML. The first reflection type diffraction element D1 is not limited to those having a refractive power of zero in this manner, and may have a predetermined refractive power. The light-absorbing member 32 is provided to be attached to the external side or a back side of the first reflection type diffraction element D1. The light-absorbing member 32 is formed of a material including a light-absorbing material such as carbon black, and absorbs the imaging light ML that has not been diffracted by the first reflection type diffraction element D1 but has passed through the first reflection type diffraction element D1. Note that an antireflection film can be formed at the surface of the first reflection type diffraction element D1.

The prism 22b is a wedge type prism, and is disposed so that an axis thereof extends in an X-axis direction that is the lateral direction. The prism 22b has a uniform cross section with respect to the X-axis direction that is the lateral direction. The prism 22b has two flat surfaces 33a and 33b that intersect the optical path and are inclined with respect to each other, and has a wedge angle α that narrows toward a tip end side farther from the first reflection type diffraction element D1. As a result of optically utilizing the two flat surfaces 33a and 33b, the prism 22b has a refractive power of zero with respect to the imaging light ML. The prism 22b deflects a path of the imaging light ML with respect to a direction corresponding to a diffraction direction of the imaging light ML directed by the first reflection type diffraction element D1. Specifically, the prism 22b deflects the imaging light ML downward so that the imaging light ML is tiled at a predetermined polarization angle in the YZ plane. At this time, the prism 22b has wavelength dispersion that is opposite to that of the first reflection type diffraction element D1, and compensates for the wavelength dispersion of the imaging light ML caused by the first reflection type diffraction element D1. As the material of the prism 22b, a material that can substantially compensate for the wavelength dispersion for each color of RGB is used.

The position of the wavelength selection unit 22 can be incorporated into the projection lens 21, without being limited to the illustrated location. For example, in the projection lens 21, the wavelength selection unit 22 can be disposed at a location where the imaging light ML is collimated. The diffraction-absorbing member 22a and the prism 22b that constitute the wavelength selection unit 22 are preferably disposed next to each other.

The transmission inclined mirror 23 is a flat plate shaped optical member, and has a planar reflection surface MS. The word of transmission in the transmission inclined mirror 23 means that light is partially transmitted. The transmission inclined mirror 23 is inclined at an angle θ=20~40° in a counterclockwise direction about the X axis when viewed from the −X side with respect to the XY plane extending in the vertical direction. The transmission inclined mirror 23 causes the imaging light ML traveling obliquely rearward through the prism 22b to be bent forward and be incident on the concave transmission mirror 24. The transmission inclined mirror 23 causes the optical axis AX that extends obliquely rearward, which is between the −Z direction and the −Y direction via the prism 22b, to be bent in the +Z direction, which is the front direction, and then causes the optical axis AX to intersect the concave transmission mirror 24.

The transmission inclined mirror 23 is formed of a metal film or a dielectric multilayer film as a transmissive reflection film on an inner side surface 23r of a parallel flat plate 23a having a uniform thickness and transparency. Such a transmissive reflection film functions as a planar reflection surface MS. The reflectance and the transmittance of the planar reflection surface MS are set to, for example, approximately 50%. An antireflection film can be formed at an outer side surface 23f of the parallel flat plate 23a.

The transmission inclined mirror 23 is disposed between the concave transmission mirror 24 and the exit pupil EP on which the eye EY or a pupil is located. The transmission inclined mirror 23 covers the exit pupil EP. The transmission inclined mirror 23 can be fixed directly or indirectly to the outer frame of the display driving unit 102 illustrated in FIG. 1, and can have a configuration in which the arrangement relationship with respect to the concave transmission mirror 24 etc. is appropriately set.

As described above, the transmission inclined mirror 23 is disposed so that the angle θ formed by the Y-axis, which is the vertical axis, and the transmission inclined mirror 23, is less than 45°. When the angle θ formed by the Y-axis and the transmission inclined mirror 23 is less than 45°, the transmission inclined mirror 23 is in a state of rising more than the standard and the thickness of the transmissive mirror in the Z-axis direction decreases. In other words, it is possible to avoid the transmission inclined mirror 23 from being disposed to protrude greatly in the −Z direction of the back face with respect to the concave transmission mirror 24, whereby avoiding an increase in the thickness of the virtual image display device 100 or the optical unit 12 in the front-rear direction in the Z direction.

The concave transmission mirror 24 is an optical member having a concave shape toward the exit pupil EP. The word of transmission in the concave transmission mirror 24 means that light is partially transmitted. The concave transmission mirror 24 has a light convergence function as a function for forming a virtual image, and performs collimation by reflecting the imaging light ML that is reflected by the transmission inclined mirror 23 and travels forward while being diverging. The imaging light ML is returned to the transmission inclined mirror 23 by the concave transmission mirror 24, and is partially transmitted through the transmission inclined mirror 23 and is collected into the exit pupil EP. That is, the concave transmission mirror 24 reflects the imaging light ML so that the imaging light ML is collected into the exit pupil EP while being collimated by a partial reflection film 24b that is concave inside. At this time, the imaging light ML is incident from a direction close to normal to the entire portion of a partial reflection surface MC of the concave transmission mirror 24, and then reflected, whereby the optical symmetry thereof is high. A plate shaped body 24a of the concave transmission mirror 24 has a uniform thickness while being curved. The plate shaped body 24a has transparency that allows light to be transmitted substantially without loss. A metal film or a dielectric multilayer film is formed as a partial reflection film 24b at an inner side surface 24r of the plate shaped body 24a. Such a partial reflection film 24b functions as a concave partial reflection surface MC. The reflectance and transmittance of the partial reflection surface MC are set to, for example, approximately 20~50%. The partial reflection surface MC ensures optical transparency of the concave transmission mirror 24 with respect to external light OL etc. A reflection type diffraction layer that 24c diffracts the imaging light ML is formed at an outer side surface 24f of the plate shaped body 24a. The reflection type diffraction layer 24c functions as a second reflection type diffraction element D2. The second reflection type diffraction element D2 ensures blocking of the concave transmission mirror 24 with respect to the imaging light ML. The second reflection type diffraction element D2 exerts functions thereof by being disposed on the external side of the partial reflection film 24b that forms the partial reflection surface MC. Here, the second reflection type diffraction element D2 is formed as part of the concave transmission mirror 24 so that a surface on the external side of the concave transmission mirror 24 is formed. In this case, a number of parts can be reduced and an increase in the weight and price of the device can be suppressed. Note that an antireflection film can be formed at the surface of the second reflection type diffraction element D2.

The partial reflection surface MC may be a free curved surface, while it is easy to have the target reflection characteristics of the partial reflection surface MC by providing an axisymmetric curved surface such as a spherical surface or an aspheric surface.

The concave transmission mirror 24 is incorporated to constitute a portion of the transmissive appearance member 105 illustrated in FIG. 1. In other words, by providing a plate member having transparency or not having transparency to the periphery of the concave transmission mirror 24, the appearance member 105 including the concave transmission mirror 24 can be provided. The appearance member 105 is not limited to a spectacle lens shape, and can have various contours or appearance.

The concave transmission mirror 24 or plate shaped body 24a preferably has a thickness of 1 mm or greater in order to ensure shape strength, but preferably has a thickness of 2 mm or less in terms of weight reduction. The plate shaped body 24a is formed from a resin material having optical transparency, for example, by injection molding.

In describing the optical path, the imaging light ML from the imaging light generation device 11 is incident on the diffraction-absorbing member 22a via the projection lens 21 and diffracted, and is incident on the transmission inclined mirror 23 via the prism 22b. An intermediate image (not illustrated), which is an appropriately enlarged image formed at the display surface 11a of the imaging light generation device 11, may be formed between the transmission inclined mirror 23 and the projection lens 21. The imaging light ML incident on the transmission inclined mirror 23 and reflected by the planar reflection surface MS by, for example, approximately 50%, is incident on the concave transmission mirror 24 and is reflected by the partial reflection surface MC, for example, at a reflectance of approximately 50% or less. The imaging light ML reflected by the concave transmission mirror 24 is transmitted through the transmission inclined mirror 23, and is incident on the exit pupil EP on which the eye EY or the pupil of the wearer US is located. Here, the exit pupil EP is an eye point of the optical unit 12 assuming that the eye EY is located. Light from each point of the display surface 11a of the imaging light generation device 11 is incident to be collected at a certain point of the exit pupil EP at an angle that allows for the observation of the virtual image. The external light OL passing through the concave transmission mirror 24 is also incident on the exit pupil EP. In other words, the wearer US wearing the HMD 200 can observe the virtual image with the imaging light ML by overlaying the virtual image on the external image.

Note that if a wavelength width of the component light of each color constituting the imaging light ML is too wide, the concave transmission mirror 24 will cause the imaging light ML to be partially transmitted without diffraction, which may generate passing light LP in front of the concave transmission mirror 24. If the intensity of the passing light LP is large, a third party OS present around the wearer US can observe a portion PI of the image displayed on the display surface 11a of the imaging light generation device 11 (see FIG. 1). In contrast, in the present exemplary embodiment, as described below, in the concave transmission mirror 24, the second reflection type diffraction element D2 is provided on the external side of the partial reflection film 24b to suppress the generation of the passing light LP, whereby the portion PI of the image is prevented from becoming observable by the third party OS.

Hereinafter, a structure and function of the diffraction-absorbing member 22a will be described with reference to FIG. 3A. the diffraction-absorbing member 22a includes a plate shaped body 31a that is a support for maintaining an overall shape, a reflection type diffraction layer 31b formed inside the plate shaped body 31a (the exit pupil EP side in FIG. 2), and a light-absorbing layer 32a that is the light-absorbing member 32 affixed to the external side of the plate-shaped body 31a. As a main part of the first reflection type diffraction element D1, the reflection type diffraction layer 31b causes the imaging light ML incident on the diffraction-absorbing member 22a to be bent in an oblique downward direction by diffraction. At this time, as in the flat surface mirror, the reflection type diffraction layer 31b reflects light rays constituting the imaging light ML while preserving the relative angular relationship thereof. Transmitted light LT, which is the imaging light ML that has not diffracted by the reflection type diffraction layer 31b, is incident on the light-absorbing layer 32a via the plate shaped body 31a, but is completely absorbed by the light-absorbing layer 32a and does not leak out.

A diffraction wavelength width of the first reflection type diffraction element D1 is equal to or smaller than a diffraction wavelength width of the second reflection type diffraction element D2 provided at the concave transmission mirror 24, which will be described later.

In the first reflection type diffraction element D1, the reflection type diffraction layer 31b includes an R diffraction layer 41a that diffracts red R light, a G diffraction layer 41b that diffracts green G light, and a B diffraction layer 41c that diffracts blue B light as the three diffraction elements corresponding to the three colors. The R diffraction layer 41a diffracts the R component ML1 of the imaging light ML, deviates the component from the original optical path, and forms a red wavelength imaging light ML emitted in the downward direction. The G diffraction layer 41b diffracts the G component ML2 of the imaging light ML, deviates the component from the original optical path, and forms a green wavelength imaging light ML emitted in the downward direction. The B diffraction layer 41c diffracts the B component ML3 of the imaging light ML, deviates the component from the original optical path, and forms a blue wavelength imaging light ML emitted in the downward direction. The R diffraction layer 41a, the G diffraction layer 41b, and the B diffraction layer 41c are reflection type diffraction elements, respectively. They are individually manufactured as film-shaped optical elements, joined to each other and laminated, and attached to the inner side surface of the plate shaped body 31a as a whole. Each of the diffraction layers 41a, 41b, and 41c is, for example, a volume hologram element. When each of the diffraction layers 41a, 41b, and 41c is a volume hologram element, the reflection type diffraction layer 31b or the first reflection type diffraction element D1 includes three diffraction layers 41a, 41b, 41c as three volume hologram layers corresponding to the three colors. In this case, the diffraction layers 41a, 41b, and 41c are produced by a technique such as irradiating a film shaped storage material with object light and reference light to interfere with each other in the storage material for exposure and recording.

The first reflection type diffraction element D1 need not have a three-layer structure including the R diffraction layer 41a, the G diffraction layer 41b, and the B diffraction layer 41c, but may be an element in which stripes that diffract the imaging light ML for each color of RGB may be collectively formed in a single layer.

Note that the reflection type diffraction layer 31b also need not be formed directly at the plate shaped body 31a or directly affixed thereon. For example, the plate shaped body 31a may be coated with a hard coat film, and the reflection type diffraction layer 31b may be formed or affixed thereon. Furthermore, the reflection type diffraction layer 31b may be embedded in the plate shaped body 31a.

Figure 3A:
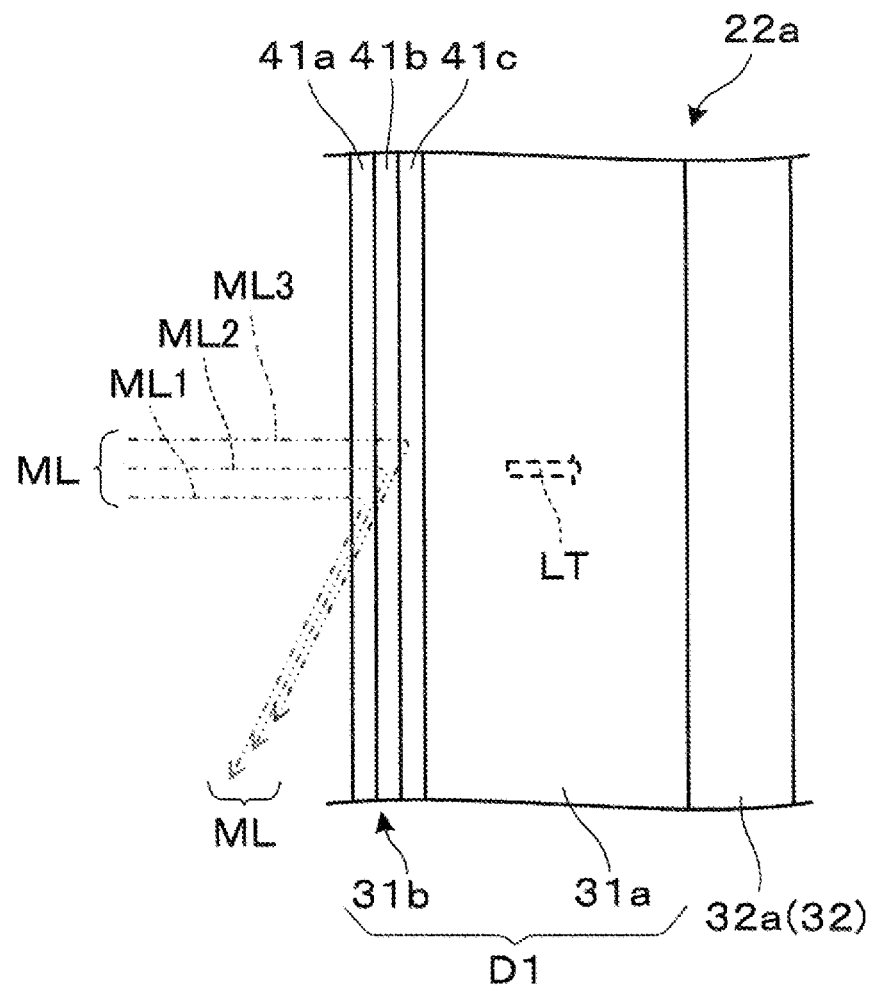
FIG. 3A is a diagram illustrating a structure, etc. of a wavelength selection unit including a first reflection type diffraction element.
Figure 3B:
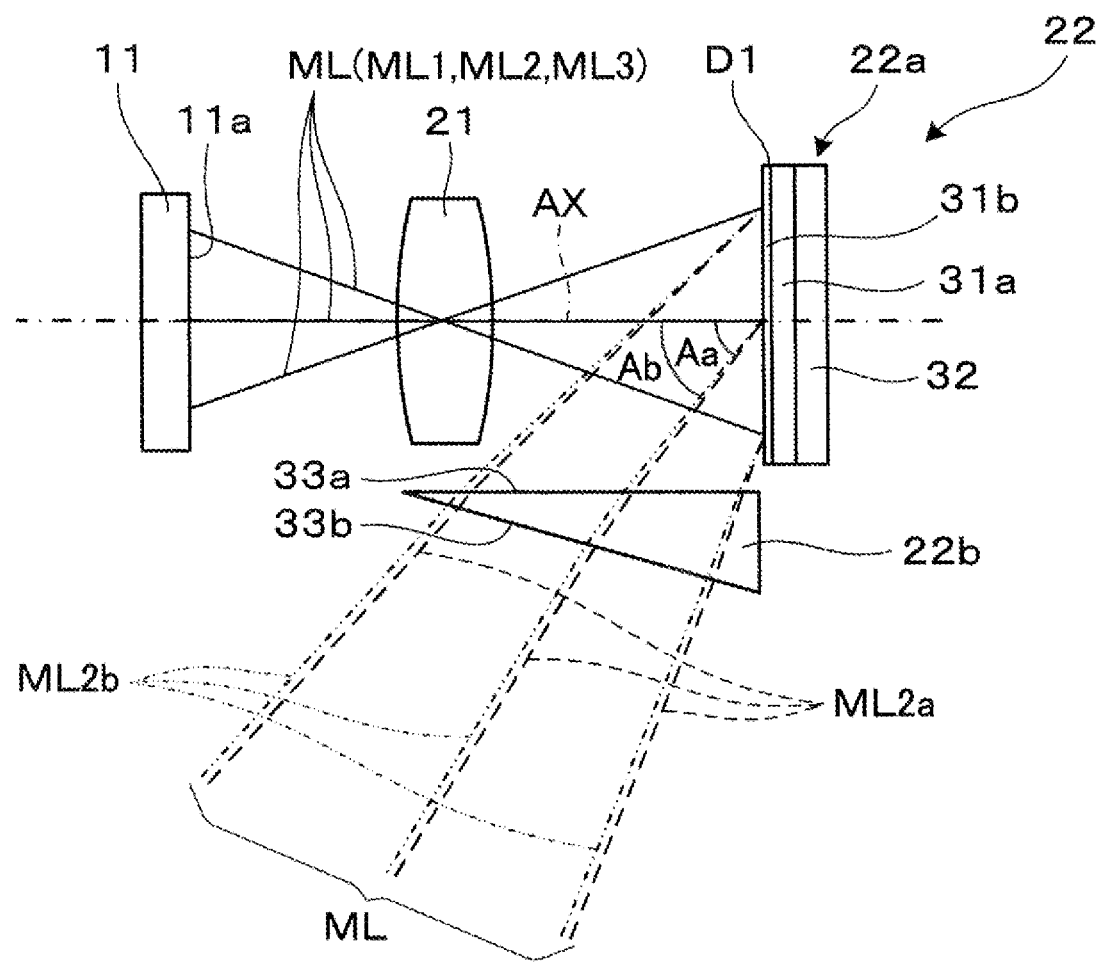
FIG. 3B is a diagram illustrating a function of a compensation prism.

Hereinafter, a function of the prism 22b will be described with reference to FIG. 3B. Due to the wavelength dispersion of the first reflection type diffraction element D1, exit angles, that are, diffraction angles of the imaging light ML emitted from the first reflection type diffraction element D1, differ depending on the wavelength thereof. Specifically, for example, when considering the G component ML2 of the imaging light ML on the optical axis AX, component ML2a closer to the long wavelength ($\lambda 1$) indicated by the dashed line is emitted from the first reflection type diffraction element D1 at a relatively large diffraction angle Aa, while component ML2b closer to the short wavelength ($\lambda 2$) indicated by the alternate long and short dash line is emitted from the first reflection type diffraction element D1 at a relatively small diffraction angle Ab. In contrast, the prism 22b has wavelength dispersion that is opposite to the first reflection type diffraction element D1. Accordingly, the wavelength dispersion of the prism 22b compensates for the wavelength dispersion of the first reflection type diffraction element D1. After passing through the prism 22b, an exit direction of the component ML2a emitted at the relatively large diffraction angle Aa from the first reflection type diffraction element D1 and an exit direction of the component M12b emitted at the relatively small diffraction angle Ab from the first reflection type diffraction element D1 approach parallel regardless of the exit position from the first reflection type diffraction element D1, and are substantially parallel at the location of the exit pupil EP, which is not illustrated. While the compensation for wavelength dispersion for the G component ML2 of the imaging light ML has been described above, the wavelength dispersion can be compensated for the R component ML1 and the B component ML3 as well, and color aberration can be reduced for each color.

Figure 4:
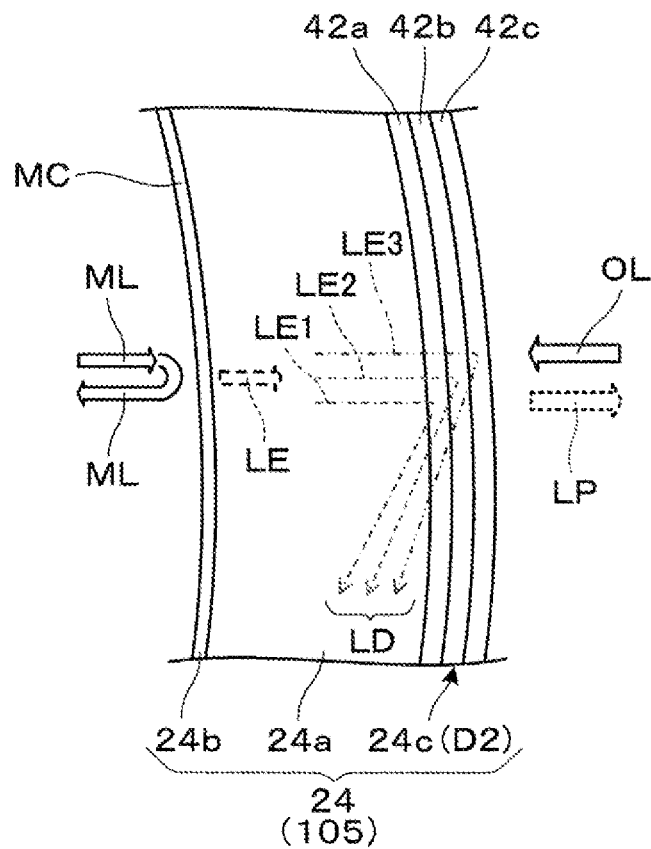
FIG. 4 is a diagram illustrating a structure, etc. of a concave transmission mirror including a second reflection type diffraction element.
Figure 5A:
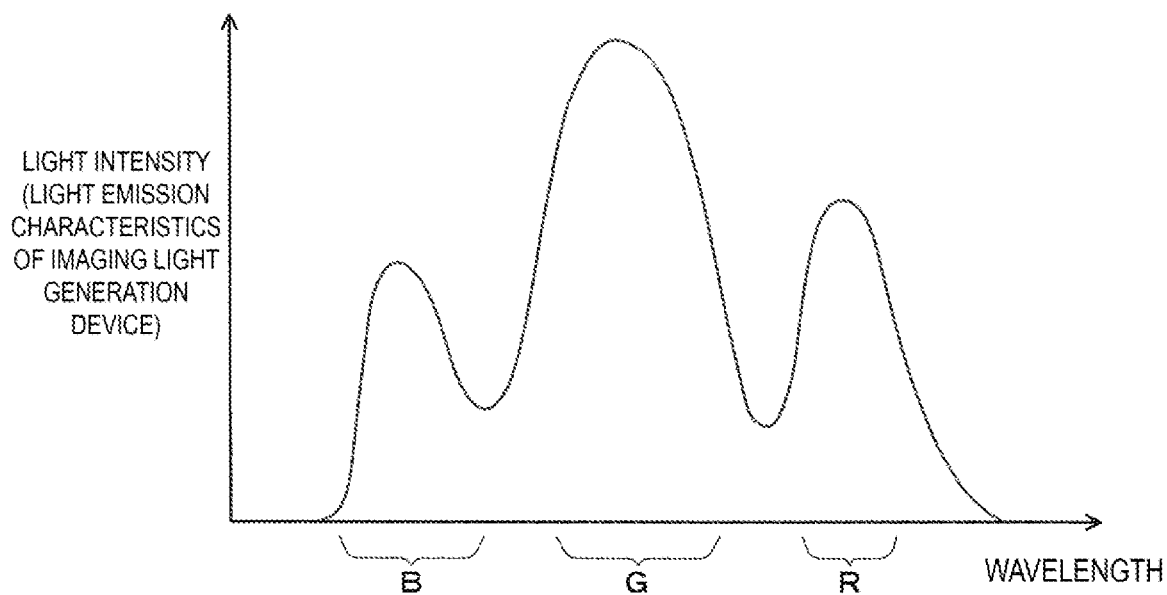
FIG. 5A is a diagram illustrating a wavelength distribution of imaging light emitted from an imaging light generation device.
Figure 5B:
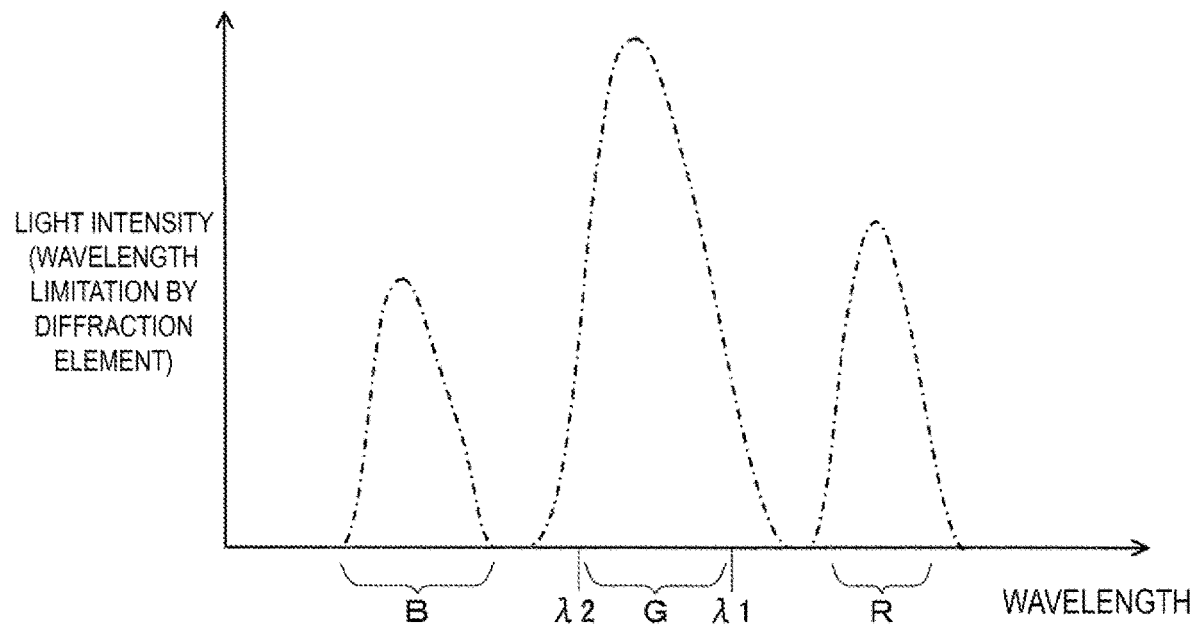
FIG. 5B is a diagram illustrating wavelength distribution of light reflected by the first reflection type diffraction element.

Hereinafter, the structure of the concave transmission mirror 24 will be described below with reference to FIG. 4. The concave transmission mirror 24 includes the plate shaped body 24a that is a support for maintaining an overall shape, the partial reflection film 24b formed inside the plate shaped body 24a (the exit pupil EP side in FIG. 2), and the reflection type diffraction layer 24c formed on the external side of the plate shaped body 24a. The partial reflection film 24b functions as a partial reflection surface MC that is concave inside, and reflects the imaging light ML at a prescribed reflectance. At this time, the partial reflection film 24b reflects the imaging light ML of the visible wavelength range substantially uniformly regardless of the wavelength. As the second reflection type diffraction element D2 that is convex outward, the reflection type diffraction layer 24c diffracts leakage light LE, which is the imaging light ML that has passed through the partial reflection film 24b, so that the leakage light LE is deviated from a linear optical path. The reflection type diffraction layer 24c is a curved surface similar to the partial reflection film 24b. The plate shaped body 24a has a substantially uniform thickness. The reflection type diffraction layer 24c bends the imaging light ML or the leakage light LE so that the imaging light ML or the leakage light LE is deviated from the linear optical path passing through the concave transmission mirror 24. Deviating the leakage light LE from the linear optical path means that the optical path of the imaging light ML or the leakage light LE is directed in another direction so as not to travel in the front face direction of the external environment. The second reflection type diffraction element D2 can be utilized to bend the leakage light LE to reflect obliquely. When the leakage light LE is incident substantially perpendicularly on the second reflection type diffraction element D2, the angle by which the leakage light LE is bent is 90° or greater with respect to the original direction, but 135° or less from the original direction so as not to be close to specular reflection. Specifically, the reflection type diffraction layer 24c bends the imaging light ML or the leakage light LE so that they are reflected downward with respect to the linear optical path passing through the concave transmission mirror 24. Here, the "downward" refers to the inner side or the exit pupil EP side of the reflection type diffraction layer 24c in a conical region extending below 45° or less with respect to the lower side of the incident point or the −Y side, along an intersection line between the tangent plane of the reflection type diffraction layer 24c at the incident point of the leakage light LE and a surface parallel to the YZ plane. Diffraction light LD bent in the downward direction by the reflection type diffraction layer 24c propagates within the plate shaped body 24a of the concave transmission mirror 24 while being reflected by the outer side surface 24f or the inner side surface 24r, and is emitted from the end portion. Alternatively, the diffraction light LD is refracted by the outer side surface 24f or the inner side surface 24r of the concave transmission mirror 24 and is emitted to the outside. Meanwhile, the diffraction light LD emitted out of the concave transmission mirror 24 is attenuated by each portion of the concave transmission mirror 24, and the exit direction thereof does not have regularity that reflects the original imaging light ML. Accordingly, even in the presence of the leakage light LE, the situation can be avoided wherein the leakage light LE is diffracted by the reflection type diffraction layer 24c, and wherein the virtual image or real image that reflects the display image formed at the display surface 11a of the imaging light generation device 11 is formed, which is observable by a third party. If the reflection type diffraction layer 24c is not present, the leakage light LE of the imaging light ML travels through the concave transmission mirror 24 and is emitted to the external side, and a portion of the virtual image or real image that reflects the display image formed at the display surface 11a of the imaging light generation device 11 can be observed to a third party. Note that an absorbent material for absorbing the diffraction light LD can be applied or adhered to the edge of the lower end of the concave transmission mirror 24.

The diffraction wavelength width of the second reflection type diffraction element D2 is equal to or greater than the diffraction wavelength width of the first reflection type diffraction element D1 provided at the wavelength selection unit 22. That is, the diffraction wavelength width of the first reflection type diffraction element D1 is equal to or smaller than the diffraction wavelength width of the second reflection type diffraction element D2. In this case, the imaging light ML diffracted by the first reflection type diffraction element D1 can be all diffracted by the second reflection type diffraction element D2, whereby information loss can be reliably prevented.

The reflection type diffraction layer 24c or the second reflection type diffraction element D2 includes an R diffraction layer 42a that diffracts red R light, a G diffraction layer 42b that diffracts green G light, and a B diffraction layer 42c that diffracts blue B light as the three diffraction elements corresponding to the three colors. The R diffraction layer 42a diffracts the R component LE1 of the leakage light LE, deviates the component from the original optical path, and forms a red wavelength range of the diffraction light LD emitted in the downward direction. The G diffraction layer 42b diffracts the G component LE2 of the leakage light LE, deviates the component from the original optical path, and forms a green wavelength range of the diffraction light LD emitted in the downward direction. The B diffraction layer 42c diffracts the B component LE3 of the leakage light LE, deviates the component from the original optical path, and forms a blue wavelength range of the diffraction light LD emitted in the downward direction. The R diffraction layer 42a, the G diffraction layer 42b, and the B diffraction layer 42c are reflection type diffraction elements, respectively. They are individually manufactured as film-shaped optical elements, joined to each other and laminated, and attached to the outer side surface 24f of the plate shaped body 24a as a whole to form the surface on the external side. Each of the diffraction layers 42a, 42b, and 42c is, for example, a volume hologram element. When each of the diffraction layers 42a, 42b, and 42c is a volume hologram element, the second reflection type diffraction element D2 includes three diffraction layers 42a, 42b, 42c as three volume hologram layers corresponding to the three colors. The diffraction layers 42a, 42b, and 42c that constitute the second reflection type diffraction element D2 can be produced by the same method as the diffraction layers 41a, 41b, and 41c that constitute the first reflection type diffraction element D1.

The second reflection type diffraction element D2 need not have a three-layer structure including the R diffraction layer 42a, the G diffraction layer 42b, and the B diffraction layer 42c, but may be an element in which stripes that diffract the imaging light ML or the leakage light LE for each color of RGB may be collectively formed in a single layer. In this manner, when the RGB imaging light ML or the leakage light LE is diffracted in a single layer, it is expected that the diffraction efficiency is reduced and some drop light is generated at the peak wavelength compared to a case where the three diffraction layers 42a, 42b, 42c are incorporated therein. However, when the light intensity of such drop light is not large, it will not be easy for the third party to observe the image in the display. Conversely, the second reflection type diffraction element D2 may have a multilayer structure with three or more layers. For example, in addition to the diffraction layers 42a, 42b, 42c described above, a fourth diffraction layer that diffracts the imaging light ML in the wavelength range between RG and a fifth diffraction layer that diffracts the imaging light ML in the wavelength range between GB can be added to obtain a second reflection type diffraction element D2 having a five-layer structure.

In the above, the reflection type diffraction layer 24c is configured to propagate the imaging light ML or the leakage light LE to be reflected or bent downward so that the imaging light ML or the leakage light LE is deviated from the linear optical path passing through the concave transmission mirror 24. Meanwhile, the imaging light ML or the leakage light LE may be propagated to be reflected or bent upward from the original optical path. Here, the "upward" refers to the inner side or the exit pupil EP side of the 24c in a conical region within 45° or less with respect to the upper side of the incident point or the +Y side, along an intersection line between the tangent plane of the reflection type diffraction layer 24c at the incident point of the leakage light LE and a surface parallel to the YZ plane. In this case, an absorbent material for absorbing the diffraction light LD can be applied or adhered to the edge of the upper end of the concave transmission mirror 24. The three diffraction layers 42a, 42b, and 42c need not diffract each color light of RGB in the same direction. One of the colors may be diffracted upward and the remaining color may be diffracted downward. The three diffraction layers 42a, 42b, and 42c need not have the same diffraction efficiency. For example, the G diffraction layer 42b having a high relative luminous efficiency can be relatively increased in diffraction efficiency.

The reflection type diffraction layer 24c may propagate the imaging light ML or the leakage light LE to be reflected or bent in the left-right lateral direction or the oblique direction of the concave transmission mirror 24. Here, the "lateral direction" refers to the inner side or the exit pupil EP side of the reflection type diffraction layer 24c in a conical region extending above 45° or less with respect to the ±X side of the incident point, along an intersection line between the tangent plane of the reflection type diffraction layer 24c at the incident point of the leakage light LE and a surface parallel to the YZ plane. In this case, an absorbent material for absorbing the diffraction light LD can be applied or adhered to the edge of the right end or the left end of the concave transmission mirror 24. However, when the diffraction angle of the leakage light LE increases in the lateral direction, the proportion of the diffraction light LD emitted from the inner surface of the concave transmission mirror 24 toward the side of the concave transmission mirror 24 is increased. To avoid this, it may also be desirable to provide a light shielding member that overhangs the face side at the left and right ends of the concave transmission mirror 24 so that the virtual image cannot be observed by the third party located on the side of the wearer US. Note that the oblique direction refers to the intermediate direction between the lateral direction and the vertical direction. The oblique direction refers to, for example, the inner side or the exit pupil EP side of the reflection type diffraction layer 24c in an intermediate direction between the +X direction and the +Y direction, and in a conical region within 45° of the intermediate direction.

Figure 6A:
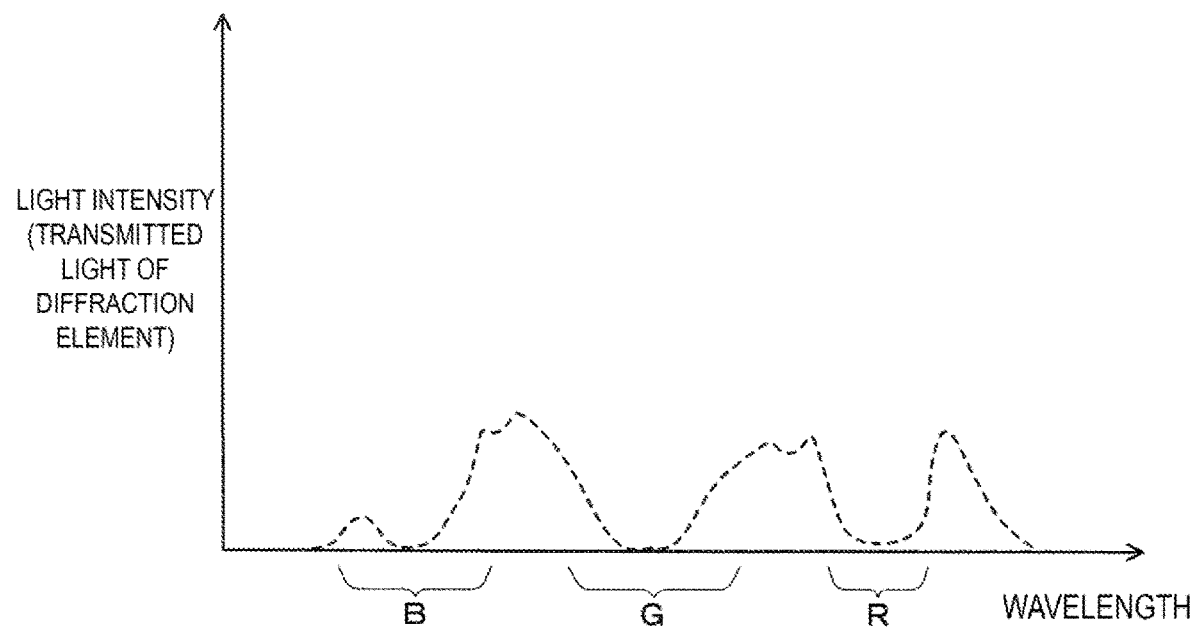
FIG. 6A is a diagram illustrating wavelength distribution of light transmitted through the first reflection type diffraction element.
Figure 6B:
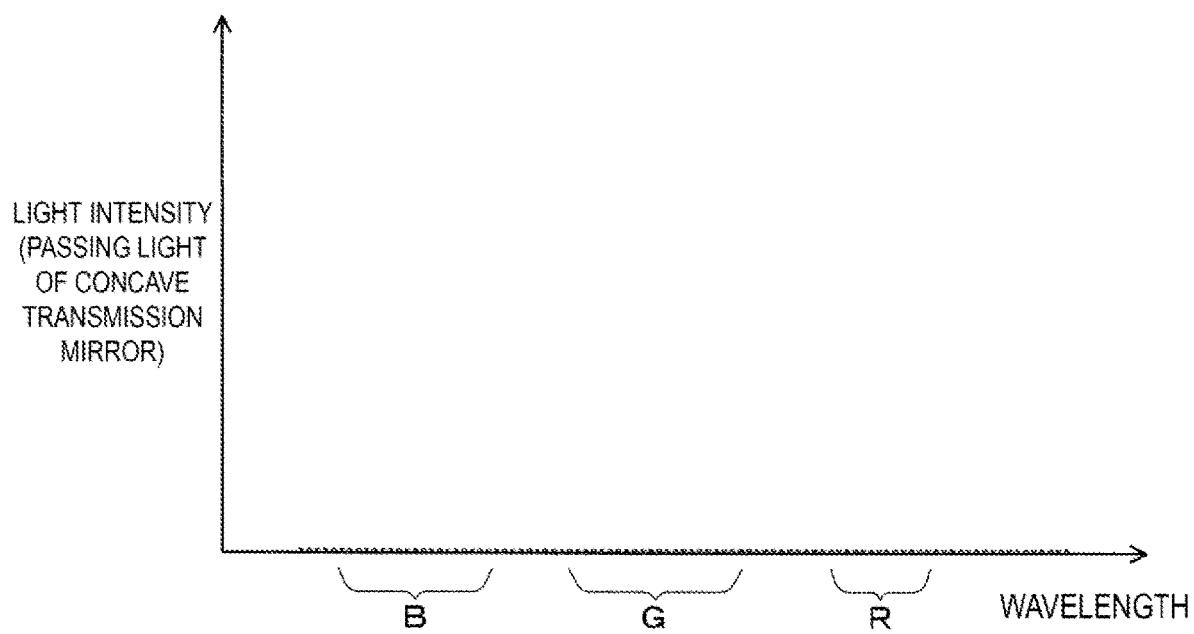
FIG. 6B is a diagram illustrating wavelength distribution of light transmitted through the second reflection type diffraction element.

FIGS. 5A, 5B, 6A, and 6B, are conceptual diagrams illustrating roles of the reflection type diffraction elements D1, D2. In the chart of each drawings, the horizontal axis indicates the wavelength and the vertical axis indicates the light intensity (arbitrary units). The wavelength characteristic of the imaging light ML indicated by the solid line in FIG. 5A corresponds to the light emission characteristics of the imaging light generation device 11, and has a peak of light intensity in the wavelength range of blue B light, green G light, and red R light. The wavelength characteristic indicated by the dot-dash line in FIG. 5B indicates the imaging light ML after diffraction by the first reflection type diffraction element D1. The components ML1, ML2, and ML3 of each color included in the imaging light ML are limited to a wavelength range that is narrower than the original wavelength range. That is, the peak wavelength width is reduced relative to that of the original wavelength range. The wavelength characteristic indicated by the solid line in FIG. 6A indicates the transmitted light LT, which is the imaging light ML that has passed through the reflection type diffraction layer 31b without being diffracted by the reflection type diffraction layer 31b. The wavelength characteristic has peaks in a wavelength region between RG, a wavelength region between GB, etc., but the peak height thereof is significantly reduced as compared with the light intensity of the original imaging light ML. This transmitted light LT is completely absorbed by the light-absorbing layer 32a. The wavelength characteristic indicated by the dotted line illustrated in FIG. 6B illustrates the light intensity of the imaging light ML that finally passes through the concave transmission mirror 24, i.e., the passing light LP, and the light intensity thereof is lowered to a level close to zero especially in the wavelength range of the B light, the G light, and the R light. The wavelength characteristic illustrated in FIG. 6B is a diagram illustrating the light intensity of the transmitted light LT outside the light absorption layer 32a, and the light intensity of the transmitted light LT outside the light absorption layer 32a is also lowered to a level close to zero. Note that the passage of the external light OL is allowed between the wavelength ranges of B, G, and R light, namely in the intermediate wavelength range of BG and intermediate wavelength range of GR, and a reliable see-through view of the external light OL is ensured, whereby a bright external image can be observed.

As described above, according to the virtual image display device 100 of the first exemplary embodiment, the second reflection type diffraction element D2 diffracts the imaging light ML so that the imaging light ML is deviated from the optical path passing through the concave transmission mirror 24, whereby the imaging light ML emitted to the external side through the partial reflection film 24b can be suppressed. At this time, the first reflection type diffraction element D1 narrows the wavelength width of the imaging light ML incident on the transmission inclined mirror 23 and the concave transmission mirror 24, whereby the ratio of diffraction by the second reflection type diffraction element D2 can be increased for the imaging light ML incident on the second reflection type diffraction element D2. As a result, the image in the display is less visible from the exterior, whereby the effect of suppressing information loss can be increased.

Second Exemplary Embodiment

Hereinafter, a virtual image display device according to a second exemplary embodiment will be described. Note that the virtual image display device according the second exemplary embodiment is obtained by modifying a part of the virtual image display device according to the first exemplary embodiment, and description on common portions is omitted.

Figure 7:
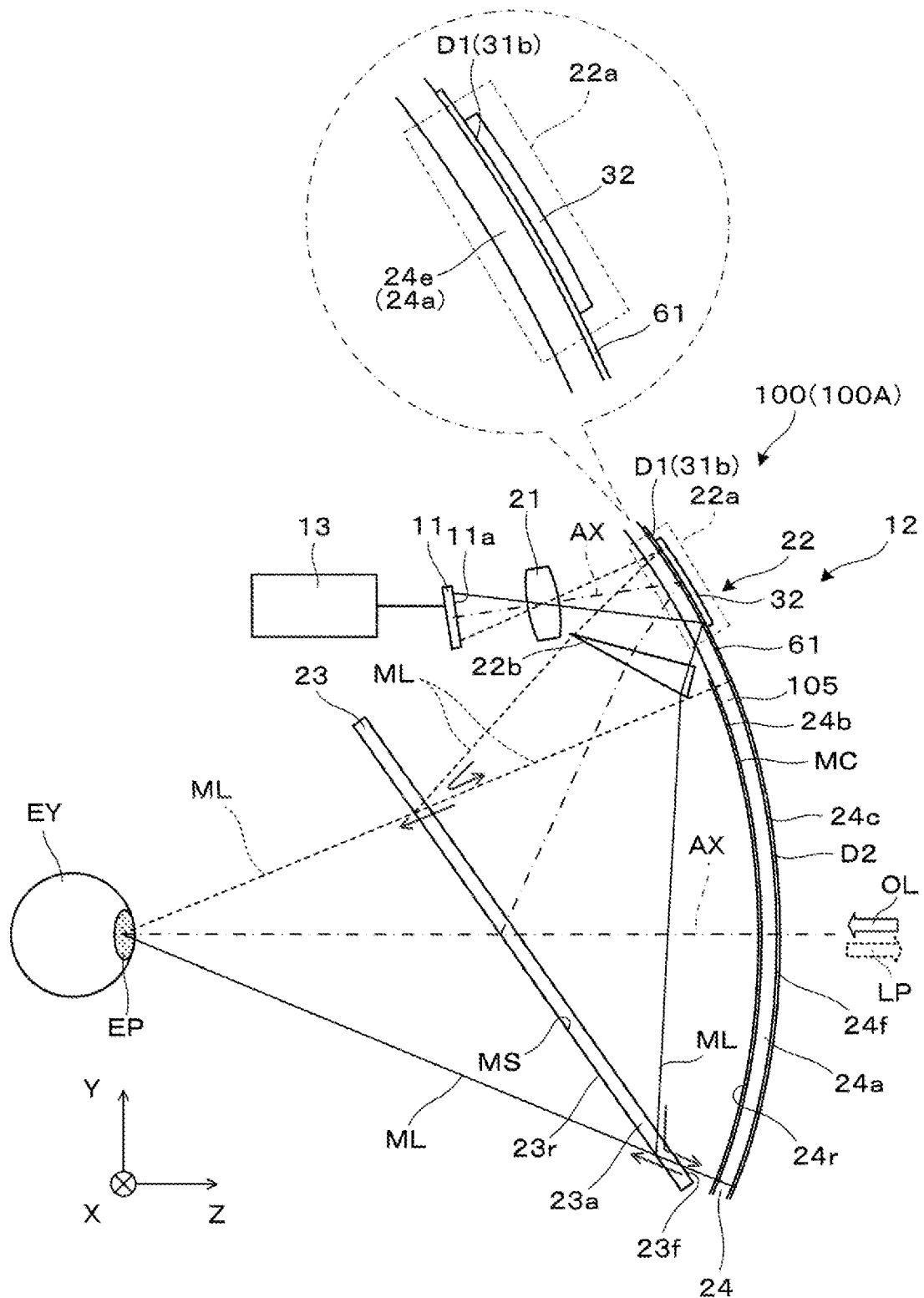
FIG. 7 is a side cross-sectional view illustrating a device of a second exemplary embodiment.

FIG. 7 is a side cross-sectional view illustrating a virtual image display device 100 of the second exemplary embodiment. In this case, the plate shaped body 24a, which is a support for the concave transmission mirror 24, is extended to form a support for the first reflection type diffraction element D1. In other words, the first reflection type diffraction element D1 and the second reflection type diffraction element D2 are formed at the plate shaped body 24a that is a common support. Furthermore, the first reflection type diffraction element D1 and the second reflection type diffraction element D2 are integrally formed to be a sheet-shaped member 61. In other words, unlike in FIG. 2, the first reflection type diffraction element D1 is formed on an external side of the plate shaped body 24a at an extended portion 24e. Further, the light-absorbing member 32 is provided to be attached to the first reflection type diffraction element D1 provided outside the extended portion 24e to cover the front of the first reflection type diffraction element D1.

In the case of a structure such as that of the present exemplary embodiment, the first reflection type diffraction element D1 and the second reflection type diffraction element D2 can be formed collectively as the sheet-shaped member 61. That is, the first reflection type diffraction element D1 and the second reflection type diffraction element D2 can be a volume hologram produced via the same exposure step, whereby the exposure process can be simplified and the diffraction wavelength width of the first reflection type diffraction element D1 and the second reflection type diffraction element D2 can be made substantially the same.

Third Exemplary Embodiment

Hereinafter, a virtual image display device according to a third exemplary embodiment will be described. Note that the virtual image display device according the third exemplary embodiment is obtained by modifying a part of the virtual image display device according to the second exemplary embodiment or the first exemplary embodiment, and description on common portions is omitted.

Figure 8:
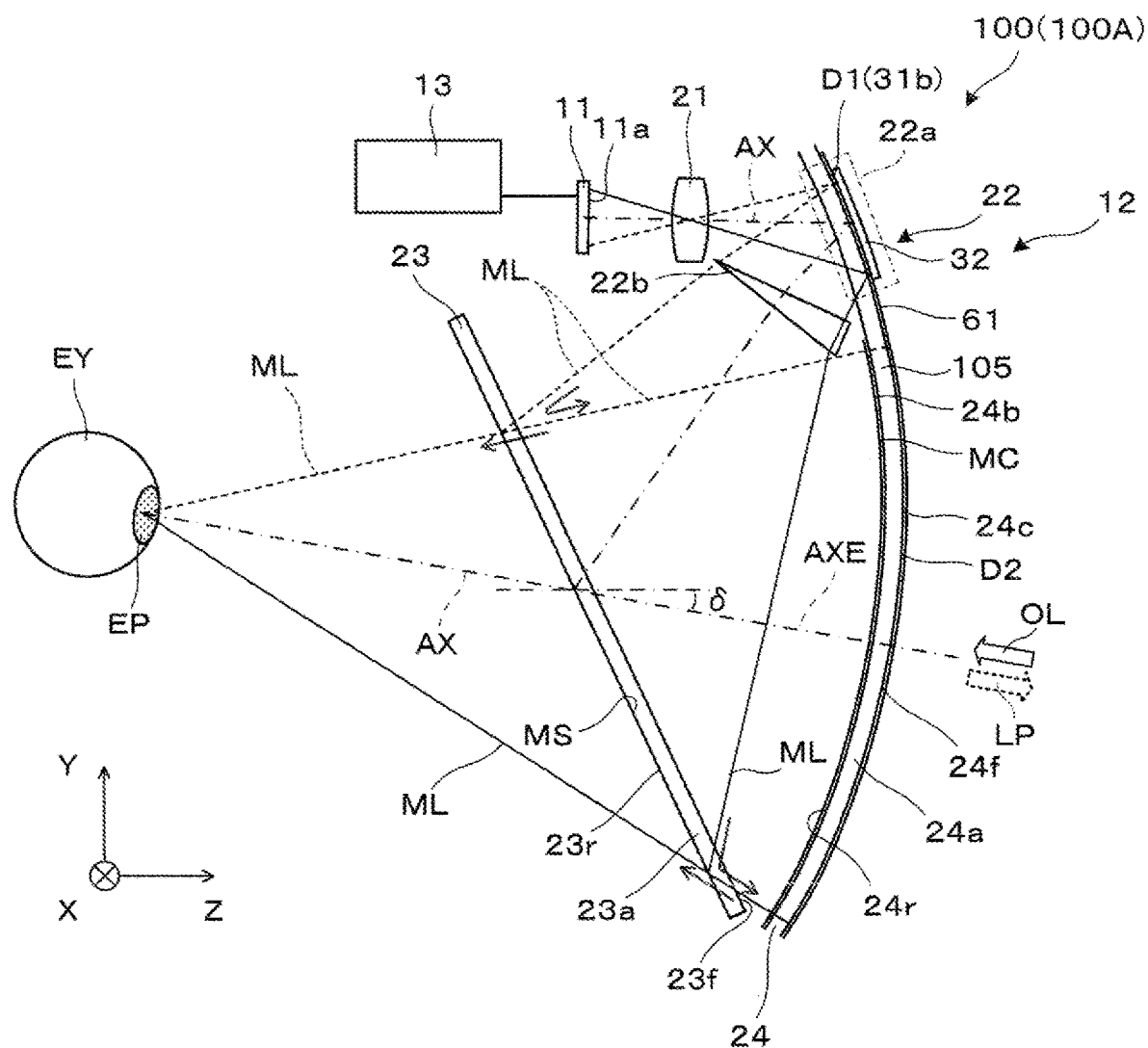
FIG. 8 is a side cross-sectional view illustrating a device of a third exemplary embodiment.

FIG. 8 is a side cross-sectional view illustrating a virtual image display device 100 of the third exemplary embodiment. In this case, the optical axis AX from the exit pupil EP through the transmission inclined mirror 23 toward the concave transmission mirror 24, that is, an exit optical axis AXE, extends inclinedly downward with a tilt angle δ=100 with respect to the forward +Z direction. The exit optical axis AXE is an axis derived from the shape symmetry of the concave transmission mirror 24. By setting the exit optical axis AXE downward to approximately 10° on the front side with respect to the Z-axis, which is the horizontal axis, the fatigue of the wearer US with the eye EY, observing the virtual image, can be reduced.

Fourth Exemplary Embodiment

Hereinafter, a virtual image display device according to a fourth exemplary embodiment will be described. Note that the virtual image display device according the fourth exemplary embodiment is obtained by modifying a part of the virtual image display device according to the first exemplary embodiment, and description on common portions is omitted.

Figure 9:
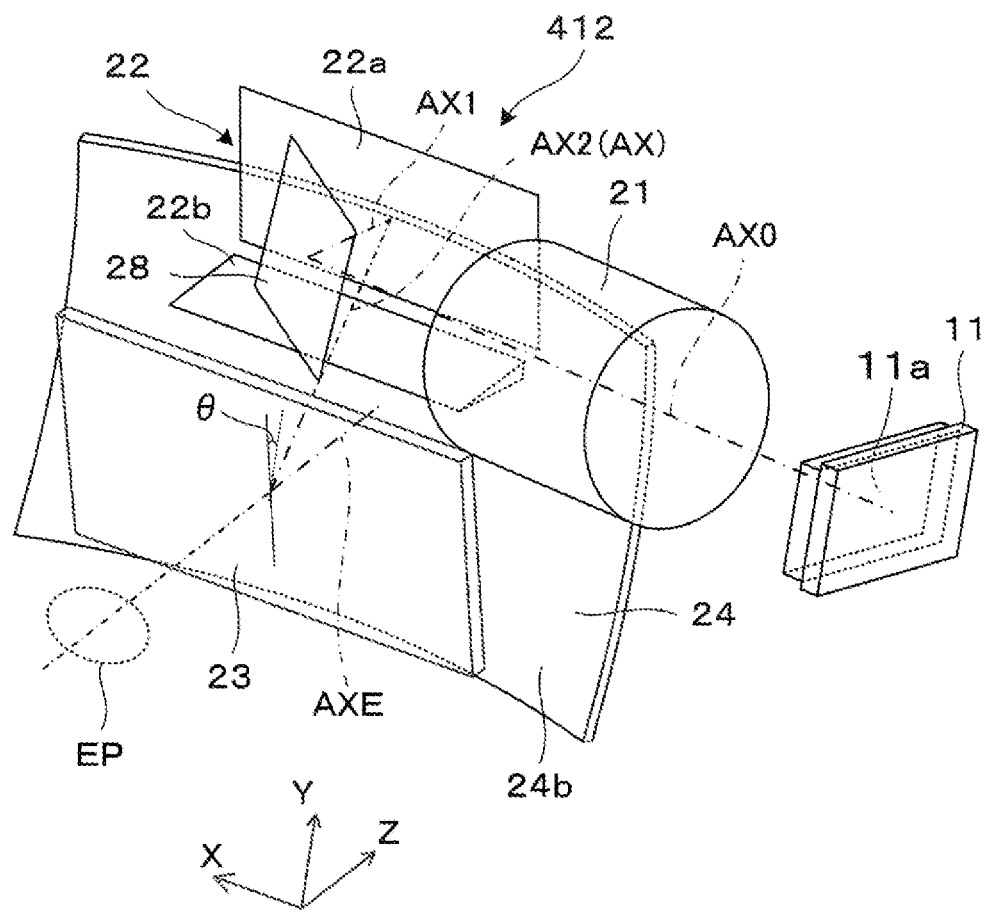
FIG. 9 is a perspective view illustrating a device of the fourth exemplary embodiment.

A virtual image display device according to the fourth exemplary embodiment will be described with reference to FIG. 9. The optical unit 412 includes the projection lens 21, a folding mirror 28, the wavelength selection unit 22, the transmission inclined mirror 23, and the concave transmission mirror 24. In other words, the folding mirror 28 is disposed between the projection lens 21 and the wavelength selection unit 22.

The folding mirror 28 reflects the imaging light ML from the projection lens 21 in the intersecting direction. A projection optical axis AX0, which is an optical axis of the projection lens 21, extends parallel to the horizontal X-axis direction. The optical path is bent along the reflective optical axis AX1 from the projection optical axis AX0 by the folding mirror 28, and the optical path is bent along the reflective optical axis AX2 from the reflective optical axis AX1 by the wavelength selection unit 22. As a result, the optical axis extending in a substantially horizontal direction on the exit side of the projection lens 21 extends that extends obliquely rearward, which is between the −Z direction and the −Y direction on the incident side of the transmission inclined mirror 23.

Figure 2:
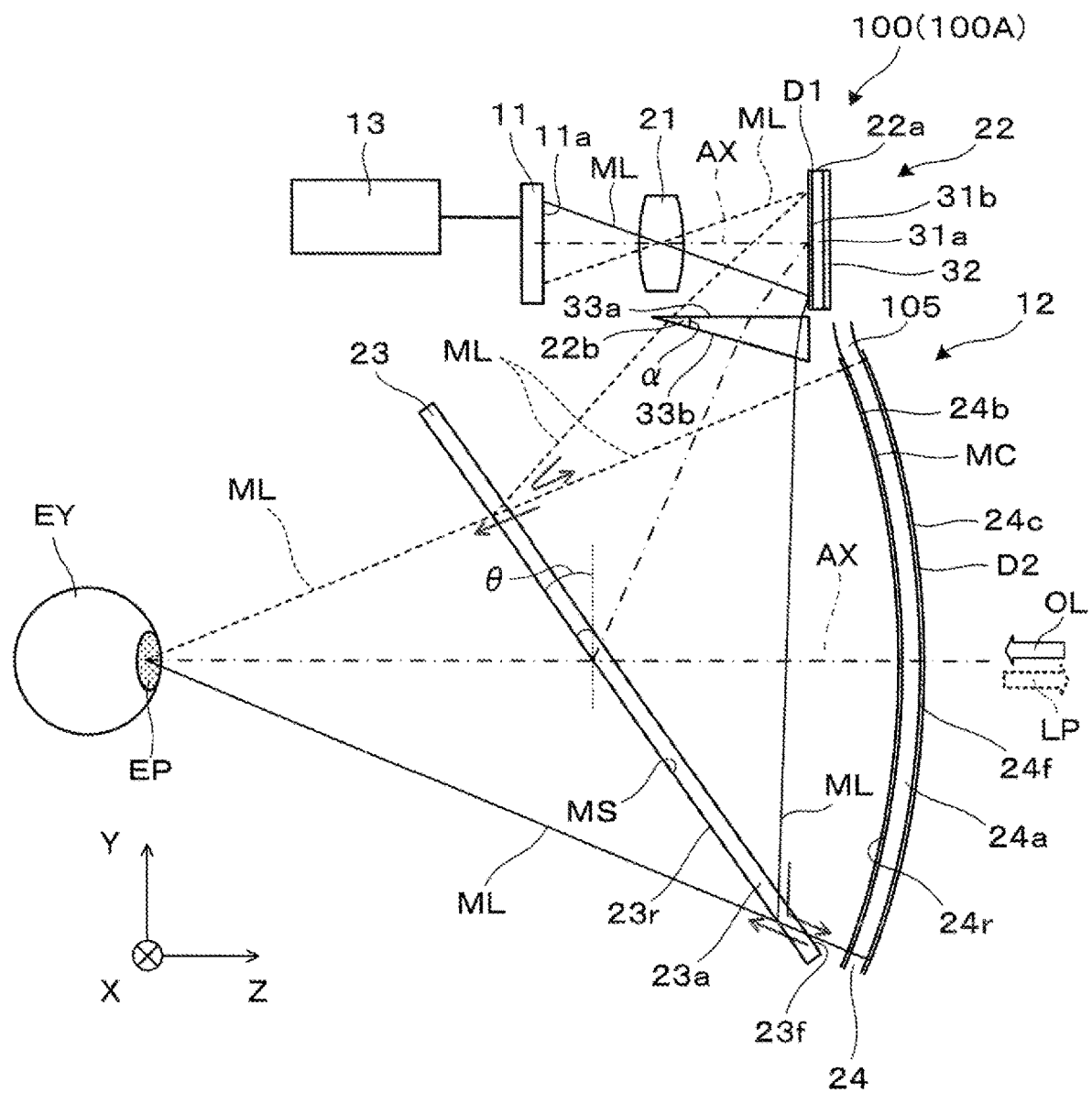
FIG. 2 is a side cross-sectional view illustrating the virtual image display device of FIG. 1.

In the optical unit 412, the wavelength selection unit 22 and the concave transmission mirror 24 are the same as those illustrated in FIG. 2.

Fifth Exemplary Embodiment

Hereinafter, a virtual image display device according to a fifth exemplary embodiment will be described. Note that the virtual image display device according the fifth exemplary embodiment is obtained by modifying a part of the virtual image display device according to the first exemplary embodiment, and description on common portions is omitted.

Figure 10:
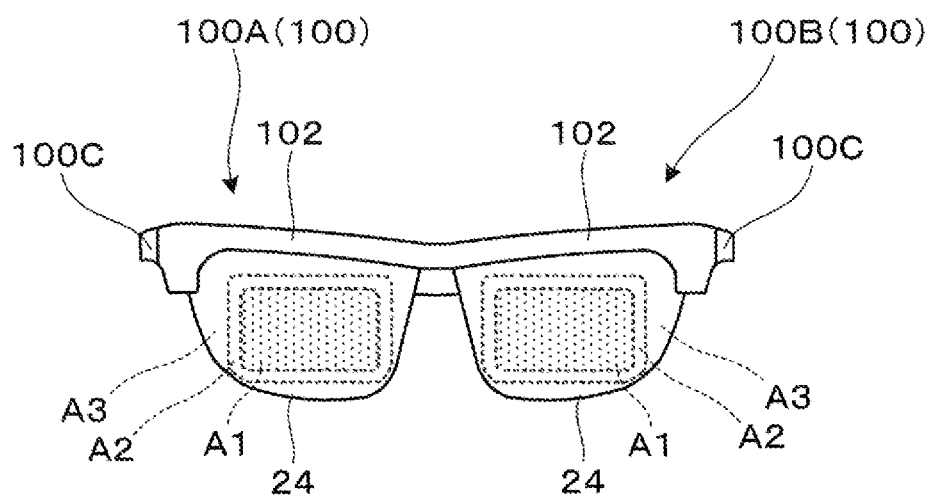
FIG. 10 is a front view illustrating a virtual image display device of a fifth exemplary embodiment.

Referring to FIG. 10, in the present exemplary embodiment, the partial reflection surface MC and the second reflection diffraction element D2 can be formed in a localized effective region A1 of the concave transmission mirror 24 or the appearance member 105. For regions A2, A3 around the effective region A1, a reflectance transition region can be formed with gradually decreasing the reflectance of the imaging light ML with respect to the partial reflection surface MC. Thus a transition region in which the diffraction efficiency of the imaging light ML gradually decreases with respect to the second reflection diffraction element D2 can be formed.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

The optical unit 12 can be an optical system that does not include the projection lens 21. In this case, the optical system collimates the display image formed at the display surface 11a of the imaging light generation device 11 by the concave transmission mirror 24.

The second reflection type diffraction element D2 may not be formed as part of the concave transmission mirror 24, and can be formed as a separate plate shaped member covering the external side of the concave transmission mirror 24.

The plate shaped body 24a that constitutes the concave transmission mirror 24 is not limited to a resin material, and may be formed from glass, synthetic quartz, or a composite of these material and a resin material.

The optical unit 12 may be an optical system including a composite of a prism and a mirror, etc. before the transmission inclined mirror 23.

The flat surfaces 33a, 33b that constitute the prism 22b can be replaced with a curved surface having a refractive power.

A virtual image display device according to a specific aspect includes an imaging light generation device, a transmission inclined mirror configured to reflect imaging light from the imaging light generation device, a concave transmission mirror including a partial reflection film, the concave transmission mirror being configured to reflect the imaging light, reflected from the transmission inclined mirror, toward the transmission inclined mirror by the partial reflection film, a first reflection type diffraction element disposed on an optical path from the imaging light generation device to the transmission inclined mirror, and a second reflection type diffraction element disposed on an external side of the partial reflection film, the second reflection type diffraction element being configured to diffract the imaging light so that the imaging light is deviated from an optical path passing through the concave transmission mirror.

In the above virtual image display device, since the second reflection type diffraction element diffracts the imaging light so that the imaging light is deviated from the optical path passing through the concave transmission mirror, the imaging light emitted to the external side through the partial reflection film can be suppressed. At this time, the first reflection type diffraction element narrows the wavelength width of the imaging light incident on the transmission inclined mirror and the concave transmission mirror, whereby the ratio of diffraction by the second reflection type diffraction element can be increased for the imaging light incident on the second reflection type diffraction element. As a result, the image in the display is less visible from the exterior, whereby the effect of suppressing information loss can be increased.

In a specific aspect, further provided is a prism disposed on an optical path on a light exit side of the first reflection type diffraction element, the prism being configured to compensate for wavelength dispersion of the imaging light, the wavelength dispersion caused by the first reflection type diffraction element. In this case, the color aberration of the imaging light by the first reflection type diffraction element can be reduced.

In another aspect, the prism is configured to deflect a path of the imaging light with respect to a direction corresponding to a diffraction direction of the imaging light diffracted by the first reflection type diffraction element.

In another aspect, the prism is a wedge type prism having a refractive power of zero for the imaging light. In this case, the prism does not affect the imaging state other than the color dispersion, whereby the optical system can be simplified.

In another aspect, the first reflection type diffraction element is configured to diffract the imaging light with respect to a vertical direction, and the prism includes a cross section that extends in a lateral direction, the cross section being uniform with respect to the lateral direction, and the prism includes a wedge angle that narrows toward a tip end side farther from the first reflection type diffraction element.

In yet another aspect, the first reflection type diffraction element is configured to diffract the imaging light while preserving a relative angular relationship of the imaging light. In this case, the first reflection type diffraction element functions as in the flat surface mirror.

In another aspect, the second reflection type diffraction element diffracts the imaging light upward or downward. A situation where the third party is present above or below the virtual image display device is unlikely to occur, and the light shielding member is easily disposed above or below the virtual image display device 100, whereby the effect of suppressing information loss can be further enhanced.

In yet another aspect, the imaging light generation device is configured to form the imaging light including three colors, and the first reflection type diffraction element and the second reflection type diffraction element include three volume hologram layers corresponding to the three colors. In this case, the diffraction efficiency for each three colors can be increased, whereby the effect of suppressing passing light emitted to the external side through the concave transmission mirror is enhanced.

In yet another aspect, provided is a light-absorbing member disposed at a back face of the first reflection type diffraction element, the light-absorbing member being configured to absorb transmitted light from the first reflection type diffraction element. In this case, the transmitted light that that has not diffracted by the first reflection type diffraction element can be prevented from being emitted to the external side.

In yet another aspect, the diffraction wavelength width of the first reflection type diffraction element is equal to or smaller than the diffraction wavelength width of the second reflection type diffraction element. In this case, the imaging light diffracted by the first reflection type diffraction element can be all diffracted by the second reflection type diffraction element, whereby information loss can be reliably prevented.

In yet another aspect, the concave transmission mirror is formed at a support having optical transparency, and the first reflection type diffraction element and the second reflection type diffraction element are formed at the support. In this case, the first reflection type diffraction element can be a component associated with the concave transmission mirror, whereby the structure of the virtual image display device can be simplified.

In yet another aspect, the first reflection type diffraction element and the second reflection type diffraction element are integrally formed to be a sheet-shaped member. In this case, the first reflection type diffraction element and the second reflection type diffraction element can be produced as a part.

In yet another aspect, the concave transmission mirror reflects the imaging light to collect the imaging light into the exit pupil.

An optical unit in a specific aspect includes a transmission inclined mirror configured to reflect imaging light, a concave transmission mirror including a partial reflection film, the concave transmission mirror being configured to reflect the imaging light, reflected from the transmission inclined mirror, toward the transmission inclined mirror by the partial reflection film, a first reflection type diffraction element disposed on an optical path on a light incident side of the transmission inclined mirror, and a second reflection type diffraction element disposed on an external side of the partial reflection film, the second reflection type diffraction element being configured to diffract the imaging light so that the imaging light is deviated from an optical path passing through the concave transmission mirror.

What is claimed is:

1. A virtual image display device comprising:
   an imaging light generation device configured to generate an imaging light;
   a first mirror configured to reflect the imaging light from the imaging light generation device;
   a second mirror configured to have a concave shape, the second mirror includes:
      a reflection film that reflects a part of the imaging light reflected from the first mirror and that transmits other part of the imaging light, the reflection film being disposed on a first surface of the second mirror,
      a reflection type diffraction layer that is disposed on a second surface of the second mirror opposite to the first surface, and
      a plate shaped body formed from a resin material having optical transparency located between the reflection film and reflection type diffraction layer,
   a reflection type diffraction element configured to be disposed on an optical path from the imaging light generation device to the first mirror, and
   a prism configured to be disposed on an optical path between the first mirror and the reflection type diffraction element, the prism configured to compensate for wavelength dispersion of the imaging light caused by the reflection type diffraction element,
   wherein
   the first mirror is disposed between the second mirror and an exit pupil of the virtual image display device and transmits the imaging light reflected from the reflection film of the second mirror toward the exit pupil,
   the reflection type diffraction layer diffracts the imaging light passed through the reflection film to an edge of the plate shape body,
   the edge of plate shape body is provided with an adsorbent material to absorb the imaging light diffracted by the reflection type diffraction layer, and
   the prism is a wedge type prism having a refractive power of zero for the imaging light.

2. The virtual image display device according to claim 1, wherein
   the prism deflects a path of the imaging light in a direction corresponding to a diffraction direction of the imaging light diffracted by the reflection type diffraction element.

3. The virtual image display device according to claim 1, wherein
   the reflection type diffraction element diffracts the imaging light in a vertical direction, and
   the prism has a cross section that extends in a direction intersecting the vertical direction and has a shape along the direction, and the prism includes a wedge angle that narrows toward a tip end side away from the reflection type diffraction element.

4. The virtual image display device according to claim 1, further comprising:
   a reflection type diffraction element configured to be disposed on an optical path from the imaging light generation device to the first mirror,
   wherein
   the reflection type diffraction element diffracts the imaging light while preserving a relative angular relationship of the imaging light.

5. The virtual image display device according to claim 1, wherein
   the reflection type diffraction layer of the second mirror diffracts the imaging light upward or downward.

6. The virtual image display device according to claim 1, further comprising:
   a reflection type diffraction element configured to be disposed on an optical path from the imaging light generation device to the first mirror,
   wherein
   the imaging light generation device generates the imaging light including three colors, and
   each of the reflection type diffraction element and the reflection type diffraction layer of the second mirror includes a hologram layer corresponding to the three colors respectively.

7. The virtual image display device according to claim 1, further comprising:
   a reflection type diffraction element configured to be disposed on an optical path from the imaging light generation device to the first mirror; and
   a light-absorbing member disposed at a back face of the reflection type diffraction element, the light-absorbing member configured to absorb transmitted light from the reflection type diffraction element.

8. The virtual image display device according to claim 1, further comprising
   a reflection type diffraction element configured to be disposed on an optical path from the imaging light generation device to the first mirror,
   wherein
   a diffraction wavelength width of the reflection type diffraction element is equal to or less than a diffraction wavelength width of the reflection type diffraction layer of the second mirror.

9. The virtual image display device according to claim 1, further comprising
   a reflection type diffraction element configured to be disposed on an optical path from the imaging light generation device to the first mirror,
   wherein
   the second mirror is formed at a support having optical transparency,
   the reflection type diffraction element and the reflection type diffraction layer of the second mirror are formed at the support.

10. The virtual image display device according to claim 9, wherein
    the reflection type diffraction element is a sheet-shape member integrated with the reflection type diffraction layer of the second mirror.

11. The virtual image display device according to claim 1, wherein
    the second mirror reflects the imaging light to collect the imaging light into an exit pupil.

12. An optical unit comprising:
    a first mirror configured to reflect an imaging light;
    a second mirror configured to have a concave shape, the second mirror includes:
       a reflection film that reflects a part of the imaging light reflected from the first mirror and that transmits other part of the imaging light, the reflection film being disposed on a first surface of the second mirror,
       a reflection type diffraction layer that is disposed on a second surface of the second mirror opposite to the first surface, and
       a plate shaped body formed from a resin material having optical transparency located between the reflection film and reflection type diffraction layer, a reflection type diffraction element configured to be disposed on an optical path from an imaging light generation device to the first mirror, and a prism configured to be disposed on an optical path between the first mirror and the reflection type diffraction element, the prism configured to compensate for wavelength dispersion of the imaging light caused by the reflection type diffraction element, wherein the first mirror is disposed between the second mirror and an exit pupil of the virtual image display device and transmits the imaging light reflected from the reflection film of the second mirror toward the exit pupil, the reflection type diffraction layer diffracts the imaging light passed through the reflection film to an edge of the plate shape body, the edge of plate shape body is provided with an adsorbent material to absorb the imaging light diffracted by the reflection type diffraction layer, and the prism is a wedge type prism having a refractive power of zero for the imaging light.

\* \* \* \* \*